June 19, 1923.

J. O. SCHWARTZ

FRONT DRIVE

Filed July 15, 1922

J. O. Schwartz,
INVENTOR

BY Victor J. Evans
ATTORNEY

WITNESS:

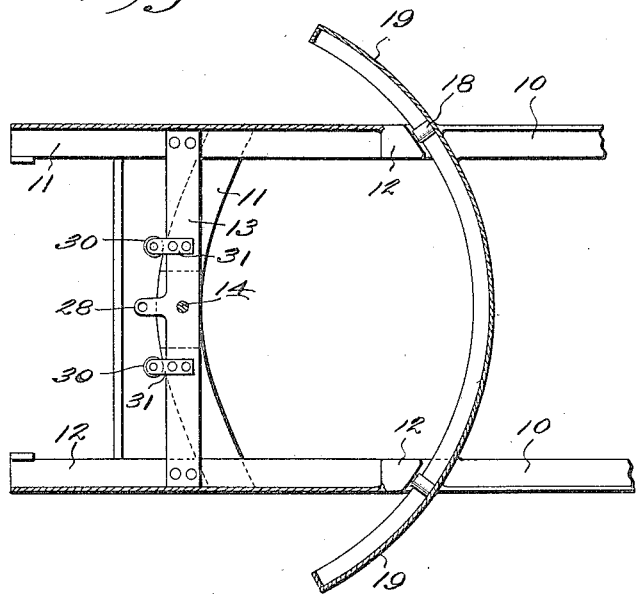
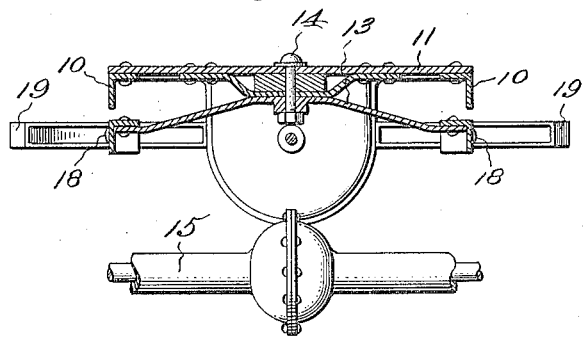

Patented June 19, 1923.

1,459,639

UNITED STATES PATENT OFFICE.

JOHN O. SCHWARTZ, OF HOPE, INDIANA.

FRONT DRIVE.

Application filed July 15, 1922. Serial No. 575,132.

*To all whom it may concern:*

Be it known that I, JOHN O. SCHWARTZ, a citizen of the United States, residing at Hope, in the county of Bartholomew and State of Indiana, have invented new and useful Improvements in Front Drives, of which the following is a specification.

This invention relates to motor operated vehicles, and contemplates a front drive for such vehicles, wherein the front axle is supported by an auxiliary frame which is mounted to turn with relation to the main frame of the vehicle, in order that the latter may be properly steered, the drive shaft being connected with the differential and transmission by universal joints.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a fragmentary side elevation of a vehicle construction showing the invention.

Figure 2 is a plan view of the Figure 1.

Figure 3 is a fragmentary horizontal sectional view through the frame of the vehicle and the segmental guide.

Figure 4 is a transverse sectional view through the frame and cross member of the vehicle, showing the adjacent parts of the mechanism.

Referring to the drawings in detail, 10 indicates the main frame of a motor operated vehicle, which includes a cross member 11 at the forward end thereof. An auxiliary frame including parallel side members 12 is arranged directly beneath the adjacent sides of the main frame 10 and these members 12 are connected together by a transverse member 13 which is pivotally associated with the cross bar 11 as at 14. Interposed between the auxiliary frame members 12 and the front axle 15 are suitable vehicle springs 17. Each of the auxiliary frame members supports at the rear end thereof a roller bearing or the like 18, and these bearings operate in segmental guides 19, of substantially U-shaped formation in cross section, and which guides are supported by the main frame 10 of the vehicle as illustrated. The headlights for the vehicle are indicated at 20, and the latter are preferably supported by the auxiliary frame member 12, so that the lights are turned simultaneously with the turning of this frame incident to steering of the vehicle.

The steering post is indicated at 21 and is journaled in any suitable manner, the lower end of this post supporting a gear 22 which meshes with a gear 23, the latter being fixed upon a shaft 24 journaled in a suitable bearing 25 supported by the adjacent frame member 10. A rod 26 has one end eccentrically connected to the gear 23 by a ball and socket joint, while the opposite end of this rod is simultaneously connected with the cross member 13 of the auxiliary frame. Consequently, when the steering post is operated to guide the vehicle, movement is imparted to the auxiliary frame in the proper direction. A pair of coiled springs or other suitable yieldable elements 27 are arranged in end to end relation at the front of the vehicle frame, and have their adjacent ends connected to a lug 28 projecting centrally from the transverse bar 13 of the auxiliary frame, while the opposite ends of these yieldable elements are secured to the members of the main frame 10. These springs are utilized as a cushioning means to take up any lost motion of the steering post, and the springs are guided over pulleys 30 which are journaled in apertured lugs 31 which project forwardly from the bar 13 of the auxiliary frame. It will be noted that these pulleys are arranged approximately at a point midway between the ends of each resilient element.

The motor is indicated at 35 and the transmission at 36, while the differential is associated with the front axle and indicated at 37.

The drive shaft 38 provides the usual connection between the transmission and differential, this shaft being connected with these parts by universal joints 39 of any suitable construction.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In a motor operated vehicle, a main frame, an auxiliary frame supported by the main frame for pivotal movement, a front axle, vehicle springs interposed between the auxiliary frame and said front axle, said auxiliary frame including a transverse member, a steering post, a connection between the steering post and the auxiliary frame, whereby the latter is moved to guide the vehicle, yieldable elements having adjacent ends secured to the transverse member of the auxiliary frame and their other ends secured to the main frame of the vehicle, said members being used to take up lost motion of the steering post, pulleys supported by the transverse member of the auxiliary frame and over which said yieldable elements are trained, a differential associated with the front axle, a transmission mechanism, a drive shaft connecting the said mechanism with the differential, and universal joints included in said connection.

In testimony whereof I affix my signature.

JOHN O. SCHWARTZ.